US007919186B2

(12) United States Patent
Clark et al.

(10) Patent No.: US 7,919,186 B2
(45) Date of Patent: Apr. 5, 2011

(54) THIN-LAYER LIGNOCELLULOSE COMPOSITES HAVING INCREASED RESISTANCE TO MOISTURE

(75) Inventors: Randy Jon Clark, Klamath Falls, OR (US); Walter B. Davis, Klamath Falls, OR (US); Jonathan Philip Alexander, West Kirby (GB)

(73) Assignee: JELD-WEN, inc., Klamath Falls, OR (US)

( * ) Notice: Subject to any disclaimer, the term of this patent is extended or adjusted under 35 U.S.C. 154(b) by 0 days.

(21) Appl. No.: 12/152,902

(22) Filed: May 16, 2008

(65) Prior Publication Data

US 2008/0286581 A1 Nov. 20, 2008

Related U.S. Application Data

(62) Division of application No. 10/785,559, filed on Feb. 24, 2004, now Pat. No. 7,399,438.

(60) Provisional application No. 60/449,535, filed on Feb. 24, 2003.

(51) Int. Cl.
*B32B 27/40* (2006.01)
*B32B 21/04* (2006.01)
*B32B 21/14* (2006.01)

(52) U.S. Cl. .................................... 428/425.1; 428/339

(58) Field of Classification Search ............... 428/423.1, 428/425.1, 113, 220, 292.4, 332, 339
See application file for complete search history.

(56) References Cited

U.S. PATENT DOCUMENTS 619,676 A 2/1899 Cronin
670,939 A 4/1901 Rapp
877,922 A 2/1908 Gager
1,183,842 A 5/1916 Alling
D132,040 S 4/1942 Cummings
2,343,740 A 3/1944 Birmingham
2,682,083 A 6/1954 Patton (Continued)

FOREIGN PATENT DOCUMENTS

CA 57271 10/1986

(Continued)

OTHER PUBLICATIONS

PCT Search Report Corresponding to PCT/US2004/005415 mailed on Oct. 28, 2004.

(Continued)

*Primary Examiner* — Thao T. Tran
(74) *Attorney, Agent, or Firm* — Stoel Rives LLP

(57) ABSTRACT

A method to produce thin-layer lignocellulosic composites, such as wood-based doorskins, that exhibit substantial resistance to moisture is disclosed. In an embodiment, the method includes the steps of forming a mixture including a refined lignocellulosic fiber, wax, and an organic isocyanate resin. The mixture is initially pressed to form a loose mat. Subsequently, the mat is pressed between two dies at an elevated temperature and pressure to further reduce the thickness of the mat and to promote the interaction of the resin with the lignocellulosic fibers. In an embodiment, a release agent is included as part of the fiber mixture, or sprayed onto the surface of the mat. The thin-layer lignocellulosic composites of the present invention exhibit strong surface strength, high adhesiveness, and a 50% reduction in linear expansion and thickness swelling upon exposure to a high moisture environment as compared to thin-layer composites that do not include the isocyanate resin.

39 Claims, 2 Drawing Sheets

U.S. PATENT DOCUMENTS 2,797,450 A 7/1957 Ropella
2,831,793 A 4/1958 Elmendorf
3,098,781 A 7/1963 Greten
3,121,263 A 2/1964 Binner
3,212,948 A 10/1965 McMahon
3,308,013 A 3/1967 Bryant
3,440,189 A 4/1969 Sharp et al.
3,484,994 A 12/1969 Ashby et al.
3,512,304 A 5/1970 Meuret
3,533,190 A 10/1970 Hilfinger et al.
3,546,841 A 12/1970 Smith et al.
3,576,092 A 4/1971 Halpern
3,616,120 A 10/1971 Warwick
D222,775 S 12/1971 Sartori
3,639,200 A 2/1972 Elmendorf et al.
3,760,543 A 9/1973 McAllister
3,773,587 A 11/1973 Flewwelling
3,793,125 A 2/1974 Kunz
3,796,586 A 3/1974 Hanion et al.
3,824,058 A 7/1974 Axer et al.
3,899,860 A 8/1975 Newell
3,919,017 A 11/1975 Shoemaker et al.
3,987,599 A 10/1976 Hines
D244,736 S 6/1977 Palka
D245,824 S 9/1977 Palka
4,072,558 A 2/1978 Akerson
4,100,138 A 7/1978 Bilow et al.
4,100,328 A 7/1978 Gallagher
4,104,828 A 8/1978 Naslund et al.
4,142,007 A 2/1979 Lampe et al.
4,146,662 A 3/1979 Eggers et al.
4,183,187 A 1/1980 Simard
4,236,365 A 12/1980 Wheeler
4,246,310 A 1/1981 Hunt et al.
4,248,163 A 2/1981 Caughey et al.
4,268,565 A 5/1981 Luck et al.
4,277,428 A 7/1981 Luck et al.
D266,042 S 9/1982 Moore et al.
4,350,543 A 9/1982 Bruguera
D266,720 S 11/1982 Moore et al.
4,359,507 A 11/1982 Gaul et al.
4,361,612 A 11/1982 Shaner et al.
4,364,984 A 12/1982 Wentworth
4,376,088 A * 3/1983 Prather ........................ 264/109
4,388,138 A 6/1983 Brown et al.
4,396,673 A 8/1983 Ball et al.
4,441,296 A 4/1984 Grabendike et al.
D274,107 S 6/1984 Gordon
D274,944 S 7/1984 Coppa
4,503,115 A 3/1985 Hemeis et al.
4,544,440 A 10/1985 Wheeler
4,550,540 A 11/1985 Thorm
4,552,797 A 11/1985 Munk et al.
D282,426 S 2/1986 Heimberger et al.
4,579,613 A 4/1986 Belanger
4,610,900 A 9/1986 Nishibori
4,610,913 A 9/1986 Barnes
D286,177 S 10/1986 Case et al.
4,622,190 A 11/1986 Schultz
4,643,787 A 2/1987 Goodman
D292,766 S 11/1987 Palka
4,706,431 A 11/1987 Corvese
4,720,363 A 1/1988 Mayumi et al.
4,742,144 A 5/1988 Nguyen et al.
4,811,538 A 3/1989 Lehnert et al.
4,830,929 A 5/1989 Ikeda et al.
4,853,062 A 8/1989 Gartland
4,876,838 A 10/1989 Hagemeyer
D304,983 S 12/1989 Palka
4,896,471 A 1/1990 Turner
4,897,975 A 2/1990 Artwick et al.
4,901,493 A 2/1990 Thorn
4,908,990 A 3/1990 Yoon et al.
4,914,844 A 4/1990 Seery
4,942,081 A 7/1990 Reiniger ....................... 428/218
4,942,084 A 7/1990 Prince
D311,957 S 11/1990 Hall
D314,242 S 1/1991 Mikolaitis
D314,625 S 2/1991 Hall
5,008,359 A 4/1991 Hunter
5,016,414 A 5/1991 Wang
D319,884 S 9/1991 Hall
5,074,087 A 12/1991 Green
5,074,092 A 12/1991 Norlander
5,075,059 A 12/1991 Green
5,089,296 A 2/1992 Bafford et al.
5,096,945 A 3/1992 Sun ................................ 524/13
5,142,835 A 9/1992 Mrocca
5,167,105 A 12/1992 Isban et al.
D335,982 S 6/1993 Brandon
5,219,634 A 6/1993 Aufderhaar
D338,718 S 8/1993 Izzo
5,239,799 A 8/1993 Bies et al.
5,262,217 A 11/1993 Blaauw
5,293,726 A 3/1994 Schick
D349,352 S 8/1994 Csat
5,344,484 A 9/1994 Walsh
5,355,654 A 10/1994 Stanley
5,369,869 A 12/1994 Bies et al.
5,397,406 A 3/1995 Vaders et al.
5,401,556 A 3/1995 Ishitoya et al.
5,443,891 A 8/1995 Bach
5,470,631 A 11/1995 Lindquist et al.
D366,939 S 2/1996 Schafernak
D367,121 S 2/1996 Schafernak
D370,269 S 5/1996 Schafernak
5,516,472 A 5/1996 Laver
D371,852 S 7/1996 Schafernak
5,543,234 A 8/1996 Lynch et al.
5,554,438 A * 9/1996 Marcinko et al. .......... 428/306.6
5,560,168 A 10/1996 Gagne et al.
D375,424 S 11/1996 Burwick
5,603,881 A 2/1997 Hanna
5,634,508 A 6/1997 Herbst
D382,350 S 8/1997 Lynch
5,677,369 A 10/1997 Walsh
D388,196 S 12/1997 Schafernak et al.
5,718,786 A 2/1998 Lindquist
5,766,774 A 6/1998 Lynch et al.
5,782,055 A 7/1998 Crittenden
5,829,218 A 11/1998 Murray et al.
5,887,402 A 3/1999 Ruggie et al.
5,900,463 A 5/1999 Tanimoto et al.
D411,022 S 6/1999 Schafernak et al.
5,908,496 A 6/1999 Singule et al.
5,941,032 A 8/1999 Lydon, Jr.
5,950,382 A 9/1999 Martino
5,972,266 A 10/1999 Fookes et al. ................. 264/122
6,024,908 A 2/2000 Koncelik
D426,645 S 6/2000 Bonomo et al.
6,073,419 A 6/2000 Moyes
6,092,343 A 7/2000 West et al.
6,200,687 B1 3/2001 Smith et al.
6,231,656 B1 * 5/2001 Dekerf et al. .............. 106/38.25
6,277,943 B1 8/2001 Sarpeshkar et al. ............ 528/65
6,288,255 B1 * 9/2001 Skinner ........................... 556/55
6,309,503 B1 10/2001 Martino
6,312,540 B1 11/2001 Moyes
6,335,082 B1 1/2002 Martino
6,368,457 B1 4/2002 Kraus et al.
6,368,528 B1 4/2002 Whelan et al.
6,378,266 B1 4/2002 Ellingson
6,401,414 B1 6/2002 Steel et al.
6,434,898 B1 8/2002 Ward et al.
6,458,238 B1 10/2002 Mente et al. ............... 156/331.4
6,464,820 B2 10/2002 Mente et al. .................. 156/296
6,470,940 B1 10/2002 Pu et al.
6,485,800 B1 11/2002 Liittschwager et al.
6,487,824 B1 12/2002 West et al.
6,531,010 B2 3/2003 Puppin
6,533,889 B2 3/2003 Dueholm ...................... 156/296
6,576,049 B1 6/2003 Dilts et al.
6,588,162 B2 7/2003 Lynch et al.
6,589,660 B1 7/2003 Templeton et al.
6,596,209 B2 7/2003 Uhland et al. ................ 264/115
6,602,610 B2 8/2003 Smith et al. ................ 428/537.1
6,610,232 B2 8/2003 Jacobsen .................... 264/117.2

| | | | | |
|---|---|---|---|---|
| 6,619,005 | B1 | 9/2003 | Chen | |
| 6,620,459 | B2 | 9/2003 | Colvin et al. | 427/303 |
| 6,696,160 | B2 | 2/2004 | Partusch et al. | |
| 6,702,969 | B2 | 3/2004 | Matuana et al. | 264/122 |
| 6,730,249 | B2 | 5/2004 | Sears et al. | 264/141 |
| 6,740,279 | B2 | 5/2004 | West et al. | 264/325 |
| 6,750,310 | B1 | 6/2004 | Skinner | 528/56 |
| 6,826,881 | B2 | 12/2004 | McGregor | |
| 6,866,740 | B2 | 3/2005 | Vaders | 156/267 |
| 6,884,852 | B1 | 4/2005 | Klauck et al. | 525/458 |
| 6,887,911 | B2 | 5/2005 | Shidaker et al. | 521/112 |
| 6,983,684 | B2 | 1/2006 | Husted | 100/92 |
| 7,018,461 | B2 | 3/2006 | Massidda et al. | 106/38.24 |
| 7,022,414 | B2 | 4/2006 | Davina et al. | |
| 7,024,414 | B2 | 4/2006 | Davina et al. | 428/534 |
| 7,029,612 | B2 * | 4/2006 | Moriarty | 264/109 |
| 7,137,232 | B2 | 11/2006 | Lynch et al. | 52/784.1 |
| 7,178,308 | B2 | 2/2007 | Fagan et al. | 52/800.1 |
| 7,284,352 | B2 | 10/2007 | Lynch et al. | 52/455 |
| 7,337,544 | B2 | 3/2008 | Fagan et al. | 29/897.32 |
| 7,370,454 | B2 | 5/2008 | Lynch et al. | 52/784.1 |
| 7,390,447 | B1 * | 6/2008 | Clark et al. | 264/120 |
| 2001/0001356 | A1 | 5/2001 | West et al. | |
| 2001/0026862 | A1 | 10/2001 | Smith et al. | |
| 2002/0005602 | A1 | 1/2002 | Jacobsen | |
| 2002/0068161 | A1 | 6/2002 | Matuana et al. | |
| 2002/0091218 | A1 | 7/2002 | Ford et al. | |
| 2002/0106498 | A1 | 8/2002 | Deaner et al. | |
| 2002/0121327 | A1 | 9/2002 | Mente et al. | |
| 2002/0121340 | A1 | 9/2002 | Menke et al. | |
| 2002/0155223 | A1 | 10/2002 | Colvin et al. | |
| 2003/0015122 | A1 | 1/2003 | Moriarty et al. | |
| 2003/0171457 | A1 | 9/2003 | Matuana et al. | |
| 2003/0200714 | A1 | 10/2003 | Minke et al. | |
| 2004/0034113 | A1 | 2/2004 | Shidaker et al. | |
| 2004/0067353 | A1 | 4/2004 | Miller et al. | |
| 2004/0229010 | A1 | 11/2004 | Clark et al. | |
| 2005/0028465 | A1 | 2/2005 | Horsfall et al. | |
| 2005/0155691 | A1 | 7/2005 | Nowak et al. | |
| 2006/0053744 | A1 | 3/2006 | Thompson et al. | |
| 2006/0272253 | A1 | 12/2006 | Wolf et al. | |
| 2007/0082997 | A1 | 4/2007 | Pfau et al. | |
| 2007/0110979 | A1 | 5/2007 | Clark et al. | |
| 2007/0204546 | A1 | 9/2007 | Lynch et al. | |
| 2009/0001628 | A1 | 1/2009 | Broker et al. | |
| 2009/0113830 | A1 | 5/2009 | Clark et al. | |
| 2009/0114123 | A1 | 5/2009 | Clark et al. | |
| 2010/0021706 | A1 | 1/2010 | Clark et al. | |

FOREIGN PATENT DOCUMENTS

| | | | |
|---|---|---|---|
| CA | 2 437 826 | | 8/2002 |
| DE | 3801486 | A1 | 8/1989 |
| EP | 0 049 299 | B1 | 4/1982 |
| EP | 0 103 048 | A2 | 3/1984 |
| EP | 0 225 629 | B2 | 6/1987 |
| EP | 0 346 640 | A1 | 12/1989 |
| EP | 0 688 639 | A3 | 3/1996 |
| EP | 0 909 295 | B1 | 3/2002 |
| EP | 1 170 456 | A1 | 9/2002 |
| EP | 1 529 919 | A1 | 5/2005 |
| GB | 2 349 163 | A | 10/2005 |
| JP | 10238236 | | 9/1998 |
| JP | 11318598 | | 11/1999 |
| WO | WO 98/32600 | | 7/1998 |
| WO | WO 00/24577 | | 5/2000 |
| WO | WO 02/64337 | | 8/2002 |

OTHER PUBLICATIONS

ABTCO, The Ultimate Source for Next-Generation Building Products, ABT Building Products Corporation, 1996.

American/Cameo, Profiles, web page at http://www.abtco.com/AmerCam2.htm, as available via the Internet and printed Jun. 17, 2000.

Article from Panel World, Sep. 2006, entitled Gutex Operation Implements New Process in Wood-Fiber Insulating Board Plant.

A recorded voluntary standard of the trade published by the U.S. Dept. of Commerce, Commercial Standard CS73-61, Old Growth Douglas Fir, Sitka Spruce and Western Hemlock Doors, 3 pgs., Effective Mar. 20, 1961.

Architectural Woodwork Quality Standards, Guide Specifications and Quality Certification Program, Fifth Edition, The Architectural Woodwork Institute, p. 109.

Aurora Brochure, "Elements of Enduring Beauty," dated 2002.

Barnett Millworks Inc. introduces Mahogany Entry Door Systems, 2000.

Bayer Polymers America, "Bayer Polymers and Warner Industries LLC Give Standard Steel Garage Doors a Facelift." Web page at http://www.pu2pu.com/htdocs/customers/bayer/Warner.htm, as available via the Internet and printed Sep. 20, 2004.

Blomberg Window Systems, 2000.

Core Molding Technologies, web page at http://www.coremt.com, as available via the Internet and printed Feb. 3, 2004.

Douglas Fir Doors, E. A. Nord Company, Specifications of Pacific Northwest Fir Doors, 3 pages, 1953.

DuPont Zonyl Fluorochemical Intermediate, Jun. 21, 2003, www.dupont.com/zonyl/pdf/intermediates.pdf.

Elite Doors Brochure—apparently published in Oct. 1987.

"Factory-Fitted Douglas Fir Entrance Doors," U.S. Department of Commerce, Commercial Standard CS91-41, Feb. 10, 1941.

Feirer, John L., Cabinetmaking and Millwork, Chas. A. Bennett Co., Inc., Peoria, IL., pp. 4, 8-14, 145-146, 596-597, 684-687, © 1970.

Fiberglass Non-Textured Entry Systems, Masonite Internerational Corporation, Big Builder, May 2003.

Grand Passage Fiberglass Entrances by Georgia Pacific, 1994.

Gurke, Huntsman Polyurethanes, New Advances in Polymeric MDI Variants, EUROCOAT, Barcelona Spain—Jun. 2002.

Hardboard Siding and Accessories, Pro-1 Hardboard Siding, web page at http://www.abtco.com/Harprod.htm, as available via the Internet and printed Jun. 17, 2000.

Hechinger Brochure—dated Mar. 16, 1986.

How to Measure, Entry Doors, Door Comparison, web page at http://www.stanleyworks.com/productgroups/doors/comparisons.asp, as available via the Internet and printed Apr. 11, 2002.

Intro 2, Entry Doors, Stanley's Commitment to Quality and Value, web page at http://www.stanleyworks.com/productgroups/doors/comparisons.asp, as available via the Internet and printed Apr. 11, 2002.

JELD-WEN Brochure, "Knotty Alder Composite Exterior Doors," dated 2003.

Knock On Wood, Pro Sales, Mar. 2002.

Lifetime Doors, Inc., Welcome to Lifetime Doors, web page at wysiwyg://29/http://www.lifetimedoors.com/Lifetime2.htm, as available via the Internet and printed Jan. 2, 2001.

Lloyd, William B., "Millwork Principles and Practices, Manufacture-Distribution-Use," Cahners Publishing Company, Inc., Chicago, IL., in assoc. with The National Woodwork Manufacturers Association, Inc., pp. VI-XV, 192, 241, 116-117, 167, 173, dated 1966.

Masonite Brand Door Facings—Brochure, 1987.

Ultimate Building Material, Milgard Windows, web page at www.milgard.com, as available via the Internet, 2001.

Mercer, Henry C., Sc. D., "Ancient Carpenter's Tools," The Bucks County Historical Society, Doylestown, PA, pp. 131-133, 1960.

Milgard WoodClad Windows and Doors, Milgard Windows, 1998.

Outswing French Door, "Are You Prepared for the Possibilities?" Web page at http://www.marvin.com/showroom/bodies/outswing.asp, as available via the Internet and printed Jun. 19, 2000.

Products, Open Design's Door, Professional Builder, Jun. 1994, p. 127.

Products and Services, Robert Bowden, Inc. Building Materials and Millwork, 2001.

Quality Doors Brochure—dated 1988.

Raised Panel Interior Doors by Premdor, Jun. 2000.

Schut, J.H., "Wood is Good for Compounding, Sheet and Profile." Plastics Technology Online Article, web page at http://www.webclipping.com/cgi-bin/hl.cgi?a-2925&c=10473&-3, as available via the Internet and printed Feb. 13, 2001.

Semco Windows and Doors. Web page available at www.semcowindows.com, as available via the Internet and printed Aug. 2000.

Sliding Patio Doors, web page at http://www.lincolnwindows.com/sidoor.htm, as available via the Internet and printed Jan. 18, 2001.
Suppliers Showcase, "Register at BIS 2004!" web page at http://www.buildingindustryshow.com/showcase.html, as available via the Internet and printed Sep. 20, 2004.
Sweet's Catalog, Section 8.3/50, p. 7, 1981.
Sweet's Catalog, Section 9.31/MO, p. 3, door in center of page, 1981.
The Finest Material, Dixie Pacific Manufacturing Company, 1996.
"The New Mission Series," product brochure by Nord, Part of the JELD-WEN family, 300 W. Marine View Drive, Everett, WA 98201-1030, 2001.
Therma-Tru Doors, Homeowners, web page at http://www.thermatru.com/homeowner/index.html, as available via the Internet and printed Apr. 11, 2002.
Tucker Millworks, "Climate Seal" Product Line, web page at http://www.tuckermillworks.com/csealintro.htm, as available via the Internet and printed Jan. 24, 2001.
Visador Brochure—date unknown.
What's New in Entry Doors: Manufacturers and Suppliers Offer a Variety of New Ways to Enhance Aesthetics and Performance, Window and Door, Aug. 2000, pp. 75-76.
What You've come to Expect from Milgard Windows, Building Products, Nov.-Dec. 2001.
Windows and Patio Doors, Lincoln Windows, Brochure, 2000, 57 pages.
"You have precisely one window in mind. Which is why we offer roughly 4,000,000 variations." Milgard Windows, Residential Architecture, May 2002.
You Wont' See G-P Products in the New American Home, Georgia-Pacific, 1994.
PCT International Search Report and Written Opinion, completed Jul. 5, 2008, mailed Jul. 14, 2008, PCT/US08/54298, International Filing date Feb. 19, 2008, JELD-WEN, inc.
Abstract of JP11318598, Nov. 24, 1999, Matsushita Electric Inc. Co. Ltd.
Abstract of JP10238236, Sep. 8, 1998, Okura Industrial Co. Ltd.
Premdor, Construction of Premdor Doors, Flush Hollow-Core Series, Premdor Reference Guide, 1998, pp. 27-28.
Composite Applications, Construction Industry, web page at http://www.appliedcompositecorp.com/const2.html, as available via the Internet and printed Feb. 3, 2004.
May 18, 2009 Office action in the corresponding European Pat. Appl. No. 04714173.4-2307.
English translation of Columbian Office Action No. 3043 in connection with the corresponding Columbian Patent Application No. 05095237 (Dated before Apr. 30, 2010).
Jul. 15, 2009 Australian Office Action in connection with the corresponding Australian Patent Application No. 2004215420.
Mar. 29, 2010 Notice of Acceptance, including allowed claims, in connection with the corresponding Australian Patent Application No. 2004215420.
Office Action dated Nov. 24, 2010 in U.S. Appl. No. 10/839,639.
Response to Office Action dated Jan. 10, 2011 in U.S. Appl. No. 10/839,639.

* cited by examiner

THIN-LAYER LIGNOCELLULOSE COMPOSITES HAVING INCREASED RESISTANCE TO MOISTURE

RELATED APPLICATIONS

This application is a divisional of U.S. patent application Ser. No. 10/785,559, filed Feb. 24, 2004, which claims priority to U.S. Provisional Application Ser. No. 60/449,535, filed Feb. 24, 2003. The disclosure of U.S. Provisional Application Ser. No. 60/449,535 is incorporated by reference in its entirety herein.

NOTICE OF COPYRIGHT PROTECTION

A section of the disclosure of this patent document and its figures contain material subject to copyright protection. The copyright owner has no objection to the facsimile reproduction by anyone of the patent document, but otherwise reserves all copyright rights whatsoever.

FIELD OF THE INVENTION

The present invention relates to the manufacture of thin-layer lignocellulosic composites, such as wood-based doorskins. More particularly, the present invention relates to thin-layer wood composites that contain an isocyanate based-resin and thus, exhibit significantly less swelling and/or shrinking upon exposure to the environment.

BACKGROUND OF THE INVENTION

A significant problem in the manufacture of wood-based composite products that are exposed to the exterior and extreme interior environments is that upon exposure to variations in temperature and moisture, the wood can lose water and shrink, or gain water and swell. This tendency to shrink and/or swell can significantly limit the useful lifetime of most exterior wood products, such as wooden doors, often necessitating replacement after only a few years. The problem is particularly prevalent in areas of high moisture (e.g., Hawaii) or in climates that are extremely hot or dry (e.g., Arizona). Shrinking and swelling can also be a problem when the wood is exposed to a wet environment during construction, or upon exposure to the dry heat used indoors in the winter.

A possible solution to the problem of moisture gain and loss in wood exposed to the elements includes covering the wood with paint and/or other coatings that act as a barrier to moisture. Still, such coatings tend to wear off with time, leaving the wood susceptible to the environment.

Rather than treating the unit at the site of installation, it may be preferable to manufacture products that exhibit increased resistance to moisture gain and loss. For example, increasing the amounts of resin content or decreasing the amount of wood fiber used in a door can increase resistance to water gain and water loss. However, such modifications can be associated with significantly increased production costs. Other options include the use of metal or fiberglass doors, but such doors are not always as aesthetically pleasing as wood doors and may have other performance problems associated with the use of these materials.

Alternatively, doors, and other structural units, may be covered with a wood-containing water-resistant layer. For example, doors may be covered with a thin-layer wood composite known as a doorskin. Doorskins are molded as thin layers to be adhesively secured to an underlying door frame to thereby provide a water-resistant outer surface. Doorskins may be made by mixing wood fiber, wax, and a resin binder, and then pressing the mixture under conditions of elevated temperature and pressure to form a thin-layer wood composite that is then bonded to the underlying door frame.

Wood composite doorskins are traditionally formed by pressing wood fragments in the presence of a binder at temperatures exceeding 275° F. (135° C.). The resin binder used in the doorskin may be a formaldehyde-based resin, an isocyanate-based resin, or other thermoplastic or thermoset resins. Formaldehyde-based resins typically used to make wood composite products include phenol-formaldehyde, urea-formaldehyde, or melamine-formaldehyde resins. Phenol-formaldehyde resins require a high temperature cure and are sensitive to the amount of water in the wood since excess water can inhibit the high temperature cure. Urea and melamine-formaldehyde resins do not require as high of a temperature cure, but traditionally do not provide comparable water-resistance (at the same resin content) in the doorskin product.

As compared to doorskins made using phenol-formaldehyde resins, doorskins that utilize high-temperature pressed isocyanate resin binder display increased surface strength. However, these doorskins exhibit decreased porosity to adhesives and thus, do not bond well to the underlying doorframe. Also, isocyanate-bonded wood composites made using currently available methods and compositions do not consistently exhibit sufficient resistance to environmentally-induced swelling and/or shrinking to be commercially useful. Thus, there remains a need for a commercially viable method to produce a thin-layer wood composite that displays resistance to shrinking and swelling. Such thin-layer wood composites are useful to protect doors and other wood-based structures exposed to the environment.

SUMMARY

Embodiments of the present invention comprise thin-layer lignocellulose composites having increased resistance to moisture and methods of making the same. An example embodiment of the present invention comprises thin-layer lignocellulosic composites that are formulated using an isocyanate resin and thus, exhibit significantly less swelling and/or shrinking upon exposure to the environment. In an embodiment, the present invention comprises a thin-layer lignocellulosic composite comprising no more than 95% by weight of a lignocellulosic fiber and at least 5% by weight of an organic isocyanate resin. In an embodiment, the lignocellulosic fiber comprises refined wood fiber. The lignocellulosic composite may further include wax. Also, the composite may include a release agent, wherein the release agent is added directly to the composite, and/or is sprayed onto the surface of the composite product. Also, the fiber used to make the composite may comprise a predetermined moisture content. Generally, the moisture content of the fiber is such that a dehydration step is not required to cure with the isocyanate resin. The thin-layer lignocellulosic composites of the present invention exhibit strong surface strength, high bonding capabilities, and up to a 50% reduction in linear expansion and thickness swelling upon exposure to a high moisture environment as compared to thin-layer composites that are made using other (non-isocyanate) resins.

Embodiments of the present invention also comprise methods for making thin layer lignocellulosic composites having high moisture resistance. In an embodiment, the method includes forming a mixture comprising a refined lignocellulosic fiber comprising a predefined moisture content and at least 5% by weight of an organic isocyanate resin and pre-pressing the mixture into a loose mat. Subsequently, the mat is pressed between two dies at an elevated temperature and pressure to further reduce the thickness of the mat and to promote the interaction of the resin with the lignocellulosic fibers. In an embodiment, the fibers are wood fibers. Also, in an embodiment, a release agent is included as part of the mixture, and/or is sprayed onto the surface of the mat. Additionally and/or alternatively, wax may be added to the lignocellulosic composite mixture.

From the foregoing summary, it is apparent that an object of the present invention is to provide methods and compositions relating to the production of wood products that are resistant to the environment. It is to be understood that the invention is not limited in its application to the specific details as set forth in the following description, figures and claims. The invention is capable of other embodiments and of being practiced or carried out in various ways.

DETAILED DESCRIPTION

Figure 1:
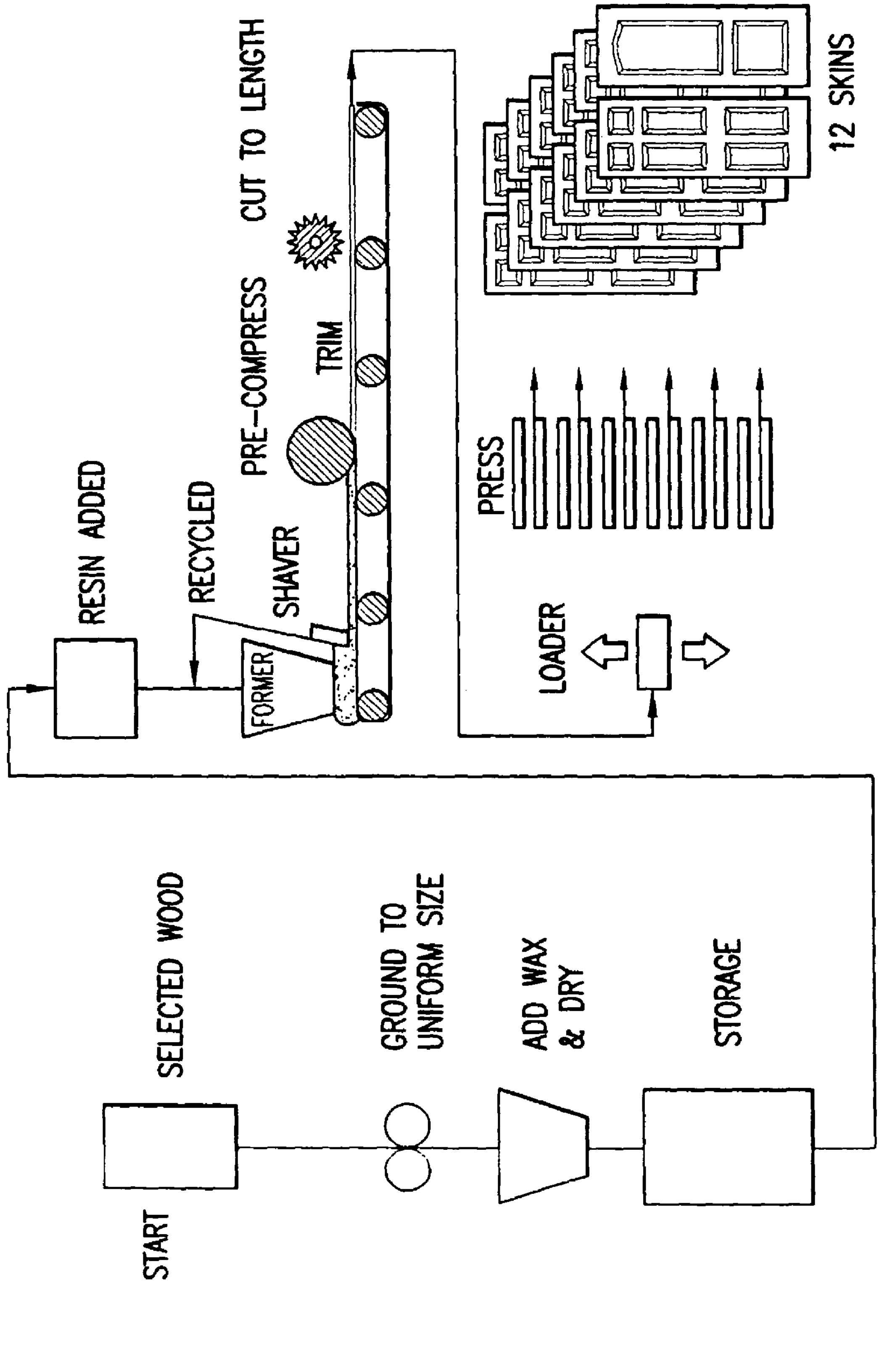
FIG. 1 shows an embodiment of a method that may be used to make a thin-layer wood composite doorskin.

The present invention provides for the manufacture of thin-layer lignocellulosic composites that include levels of isocyanate-based resins that protect the composite from shrinking and swelling upon exposure to the elements. The invention may be applied to various types of lignocellulosic thin-layer composites to generate structural units that may be exposed to weathering by heat, moisture, air, and the like. In an embodiment, the present invention describes a method to make wood-based doorskins that are resistant to shrinking and swelling.

Thus, in an embodiment, the present invention comprises a method to produce a thin-layer lignocellulosic composite having increased resistance to moisture-induced shrinking and swelling comprising the steps of: (a) forming a lignocellulosic composite mixture comprising at least one type of lignocellulosic fiber comprising a predefined moisture content and at least 5% by weight of an organic isocyanate resin; (b) pre-pressing the mixture into a loose mat; and (c) pressing the mat between two dies at an elevated temperature and pressure and for a sufficient time to further reduce the thickness of the mat to form a thin-layer composite of predetermined thickness, and to allow the isocyanate resin to interact with the lignocellulosic fiber such that the resultant thin-layer composite has a predetermined resistance to moisture.

The present invention also comprises thin-layer lignocellulosic composites made by the methods of the invention. Thus, in another embodiment, the present invention also comprises a thin-layer lignocellulosic composite comprising a mixture of no more than 95% by weight of at least one type of lignocellulosic fiber, wherein the fiber has a predetermined moisture content, and at least 5% by weight of an organic isocyanate resin, wherein mixture is pressed between two dies at an elevated temperature and pressure and for a sufficient time to form a thin-layer composite of predetermined thickness, and to allow the isocyanate resin to interact with the lignocellulosic fiber such that the resultant thin-layer composite has a predetermined resistance to moisture.

The lignocellulosic fiber comprises a material containing both cellulose and lignin. Suitable lignocellulosic materials may include wood particles, wood fibers, straw, hemp, sisal, cotton stalk, wheat, bamboo, jute, salt water reeds, palm fronds, flax, groundnut shells, hard woods, or soft woods, as well as fiberboards such as high density fiberboard, medium density fiberboard, oriented strand board and particle board (see e.g., U.S. Pat. No. 6,620,459 for a description of lignocellulosic fibers). In an embodiment, the lignocellulosic fiber is refined. As used herein, refined fiber comprises wood fibers and fiber bundles that have been reduced in size from other forms of wood such as chips and shavings. The refined wood fiber is normally produced by softening the larger wood particles with steam and pressure and then mechanically grinding the wood in a refiner to produce the desired fiber size. In an embodiment, the lignocellulosic fiber of the thin-layer composites of the present invention comprise wood fiber.

As used herein, a thin-layer composite comprises a flat, planar structure that is significantly longer and wide than it is thick. Examples of thin-layer lignocellulosic composites include wood-based doorskins that are used to cover the frame of a door to provide the outer surface of the door. Such doorskins may be only about 1 to 5 mm thick, but may have a surface area of about 20 square feet (1.86 square meters) or more. Other thin-layer lignocellulosic products may include Medium Density Fiberboard (MDF), hardboard, particleboard, Oriented Strand Board (OSB) and other panel products made with wood. These products are normally 3 to 20 mm in thickness.

In an embodiment, the lignocellulosic composite mixture further comprises at least one type of wax. For example, the mixture may comprise up to about 2% by weight of wax. In an embodiment, about 0.5% by weight wax is used.

The wax may impart additional short-term water repellency to the wood composite. The type of wax used is not particularly limited, and waxes standard in the art of wood fiber processing may be used. Generally, the wax should be stable to the temperatures used for pressing the wood/resin mixture into a thin layer, increase the water repellency of the wood, and not adversely affect the aesthetics or subsequent processing (such as priming or gluing) of the wood composite. Thus, the wax may be a natural wax or a synthetic wax, generally having a melting point in the range of about 120° F. (49° C.) to about 180° F. (82° C.). Waxes used may include, but are not limited to, paraffin wax, polyethylene wax, polyoxyethylene wax, microcrystalline wax, shellac wax, ozokerite wax, montan wax, emulsified wax, slack wax, and combinations thereof.

As described herein, the lignocellulosic mixtures of the present invention are pressed into thin-layers using flat or molded dies at conditions of elevated temperature and pressure. In an embodiment, the mixture is initially formed into a loose mat, and the mat is placed in the die press. Because the composite includes amounts of resin that are sufficient to increase the water resistance of the composite mixture, the composite may stick to the surface of the dies that are used to press the mat into the resultant thin layer composite. Thus, in an embodiment, the method includes steps to reduce sticking of the thin-layer composite to the dies.

In an embodiment, the method includes exposing the lignocellulosic composite mixture to a release agent prior to pressing the composite between the dies. In an embodiment, the release agent comprises an aqueous emulsion of surfactants and polymers. For example, the release agent may comprise compounds used in the doorskin manufacturing industry such as, but not limited to, PAT®7299/D2 or PAT®1667 (Wurtz GmbH & Co., Germany).

The release agent may be added directly to the lignocellulosic composite mixture as an internal release agent prior to pre-pressing the mixture into a loose mat. Alternatively and/or additionally, the release agent may be sprayed on the surface of the mat before the mat is pressed into a thin layer.

Where the release agent is added directly to the mixture as an internal release agent, the amount of release agent added may range from about 0.5 to about 8 weight percent of the mixture. In one embodiment, about 2 weight percent release agent is used.

Where the release agent is sprayed onto a surface of the mat, the amount of release agent sprayed on to the mat surface may comprise from about 0.1 to about 8.0 grams solids per square foot (1.1 to 86.1 grams per square meter) of mat surface. In another embodiment, the amount of release agent sprayed on the mat surface may comprise about 4 grams solids per square foot (43 grams per square meter) of mat surface. The release agent may be applied as an aqueous solution. In an embodiment, an aqueous solution of about 25% release agent is applied to the mat surface. When the thin-layer composite comprises a doorskin, the release agent may be applied to the surface of the mat that corresponds to the surface that will become the outer surface of the doorskin.

In an embodiment, the thin-layered lignocellulosic composite is colored. For example, in one embodiment, the release agent may comprise a pigment. In this way, an even coloring is applied to the thin-layered lignocellulosic composite.

Thus, the thin-layer lignocellulosic composites of the present invention may comprise wood fibers as well as wax and/or a release agent. For example, in an embodiment, the present invention comprises a wood composite comprising a mixture of: (i) no more than 95% by weight of a wood fiber, wherein the wood fiber has a predetermined moisture content; (ii) at least 5% by weight of an organic isocyanate resin; (iii) optionally, at least 0.5% by weight of a wax; and (iv) optionally, at least 1% internal release agent by weight and/or at least 0.1 grams release agent per square foot (1.1 grams per square meter) on the surface of the composite.

Other strategies may be used to reduce sticking of the lignocellulosic composite to the dies used for making the resultant thin-layer composite. Thus, in another embodiment, at least one surface of the die used to press the mat is exposed to an anti-bonding agent. In an embodiment, exposing the die to an anti-bonding agent may comprise coating at least one of the dies used to press the mat with an anti-bonding agent. In an embodiment, coating the die may comprise baking the anti-bonding agent onto the die surface.

In an embodiment, the release agent is not the same as an anti-bonding agent. The release agent comprises a compound that will not interfere with subsequent processing of the resulting thin-layer composite. In contrast, the anti-bonding agent may comprise compositions known in the art of pressing wood composites as being effective in preventing sticking to the pressing dies, but that may be problematic if included as part of the composite.

For example, in an embodiment, the anti-bonding agent used to coat the die surface comprises silane or silicone. Thus, the anti-bonding agent used to coat the die surface may comprise anti-bonding agents known in the art of die pressing such as, but not limited to, CrystalCoat MP-3 13 and Silvue Coating (SDC Coatings, Anaheim, Calif.), Iso-Strip-23 Release Coating (ICI Polyurethanes, West Deptford, N.J.), aminoethylaminopropyltrimethoxysilane (Dow Corning Corporation), or the like.

For thin-layer doorskins, the die that is coated with the anti-bonding agent may preferably correspond to the die used to press the outside surface of the doorskin. Alternatively, both dies may be coated with an anti-bonding agent. In an embodiment, the amount of anti-bonding agent used to coat the die surface may range in thickness from about 0.0005 to about 0.010 inches (i.e., about 0.0127 mm to about 0.254 mm). Thus, in one embodiment, the amount of anti-bonding agent used to coat the die surface comprises about 0.003 inches (i.e., about 0.0762 mm).

In an embodiment, coating the die comprises baking the anti-bonding agent onto the die surface. For example, in one embodiment, the step of baking the anti-bonding agent onto the die surface may comprise the steps of: (1) cleaning the die surface free of dirt, dust and grease; (ii) spraying from about 0.0005 to 0.010 inches (0.5 to 10 mils or about 0.0127 to 0.254 mm) of a 50% solution of the anti-bonding agent onto the die; and (iii) baking the die at greater than 300° F. (149° C.) for about 1 to 4 hours.

In an embodiment, the step of exposing the pre-pressed mat to at least one release agent and/or anti-bonding agent may comprise adding an internal release agent and/or spraying one side of the mat with a release agent and also coating at least one die surface with an anti-bonding agent. In this embodiment, the side of the mat coated with the release agent is the surface opposite to the surface of the mat exposed to the coated die. For example, in an embodiment, the present invention comprises a method to produce a thin-layer wood composite having increased water resistance comprising the steps of: (a) forming a mixture comprising: (i) a refined wood fiber comprising a predefined moisture content; (ii) a wax; (iii) at least 5% by weight of an organic isocyanate resin; and (iv) optionally, a release agent; (b) pre-pressing the mixture into a loose mat; (c) optionally, spraying one surface of the mat with a release agent; and (d) pressing the mat between two dies at an elevated temperature and pressure and for a sufficient time to further reduce the thickness of the mat to form a thin-layer composite of predetermined thickness, and to allow the isocyanate resin to interact with the wood fibers such that the doorskin has a predetermined resistance to moisture, wherein at least one of the die surfaces has been coated with an anti-bonding agent.

The thin-layered lignocellulosic composites of the present invention may comprise a range of fiber compositions. Thus, in an embodiment, the lignocellulosic composite mixture comprises about 80% to about 95% by weight fiber.

The thin-layered wood composites of the present invention may comprise lignocellulosic fiber comprising a range of moisture levels. In an embodiment, the method does not require dehydrating the lignocellulosic fiber prior to treatment with the resin. Thus, in an embodiment, the lignocellulosic fiber comprises from about 7% to about 20% moisture content by weight. In another embodiment, the lignocellulosic fiber may comprise from about 10% to about 14% moisture by weight.

The organic isocyanate resin used may be aliphatic, cycloaliphatic, or aromatic, or a combination thereof. Also, although monomers may be preferred, polymeric isocyanates may also be used. In an embodiment, the isocyanate may comprise diphenylmethane diisocyanate (MDI) or toluene diisocyanate (TDI) such as Lupranate®M2OFB Isocyanate (BASF Corporation, Wyandotte, Mich.). For example, in an embodiment, the isocyanate comprises diphenylmethane-4, 4'-diisocyanate. Or, in an embodiment, the isocyanate is selected from the group consisting of toluene-2,4-diisocyanate; toluene-2,6-diisocyanate; isophorone diisocyanate; diphenylmethane-4,4'-diisocyanate; 3,3'-dimethyldiphenylmethane-4,4'-diisocyanate; m-phenylene diisocyanate; p-phenylene diisocyanate; chlorophenylene diisocyanate; toluene-2,4,6-triisocyanate; 4,4',4"-triphenylmethane triisocyanate; diphenyl ether 2,4,4'-triisocyanate; hexamethylene-1,6-diisocyanate; tetramethylene-1,4-diisocyanate, cyclohexane-1,4-diisocyanate; naphthalene-1,5-diisocyanate; 1-methoxyphenyl-2,4-diisocyanate; 4,4'-biphenylene diisocyanate; 3,3'-dimethoxy-4,4'-biphenyl diisocyanate; 3,3'-dimethyl-4,4'-biphenyl diisocyanate; 4,4'-dimethyldiphenylmethane-2,2',5,5'-tetraisocyanate; 3,3'-dichlorophenyl-4,4'-diisocyanate; 2,2',5,5'-tetrachlorodiphenyl-4,4'-diisocyanate; trimethylhexamethylene diisocyanate; m-xylene diisocyanate; polymethylene polyphenylisocyanates; and mixtures thereof (see e.g., U.S. Pat. No. 5,344,484 for a description of isocyanates that may be used to formulate wood doorskins).

A range of isocyanate resin levels may be used to make the thin-layer composites of the present invention. Thus, in an embodiment, the mixture used to form the 20 composite may comprise from about 6.5% to about 15% by weight resin solids. In another embodiment, the mixture may comprise about 10% by weight resin solids.

The conditions used to form the thin-layer composite include compressing the mixture at elevated temperature and pressure for sufficient time to allow the isocyanate resin to interact with the wood fibers such that the resultant thin-layer composite has a predetermined resistance to moisture. The exact conditions used will depend upon the equipment used, the exterior environment (e.g., temperature, elevation), the manufacturing schedule, the cost of input resources (e.g., starting materials, electric power), and the like. Also, varying the temperature may allow for changes to be made in the pressure used or the time of pressing; similarly, changes in pressure may require adjustment of the time and/or temperature used for pressing the thin-layer composites of the present invention.

A range of temperatures may be used to promote interaction of the isocyante resin with the lignocellulosic fibers in the mixture. In an embodiment, the temperature used to press the mixture (or preformed mat) into a thin-layer composite may range from about 250° F. (121° C.) to about 400° F. (204° C.). In another embodiment, the temperature used to press the mixture (or preformed mat) into a thin-layer composite may range from about 280° F. (138° C.) to about 350° F. (177° C.). Or, a temperature that is in the range of from about 310° F. (154° C.) to about 330° F. (166° C.) may be used.

Similarly, the levels of the pressure applied during the pressing of the thin-layer composite may vary depending on a variety of factors, such as the nature of the thin-layer composite that is being formed, the equipment being used, environmental conditions, production capabilities, and the like. Thus, in an embodiment, the pressure during the pressing step may range from about 2500 psi (176 kg/cm$^2$) to about 150 psi (10.5 kg/cm$^2$). In another embodiment, the pressure may be applied in a step-wise manner. In another embodiment, the pressure during the pressing step ranges from about 1200 psi (84.3 kg/cm$^2$) for about 5 to 20 seconds followed by 500 psi (35.16 kg/cm$^2$) for 20 to 80 seconds. For example, in one embodiment, the pressure during the pressure step ranges from about 1200 psi (84.3 kg/cm$^2$) for about 10 seconds to about 500 psi (35.16 kg/cm$^2$) for about 50 seconds.

The thin-layer lignocellulosic composites of the present invention have increased resistance to moisture-induced shrinkage and swelling. As used herein, increased resistance to moisture comprises reduced shrinking and/or swelling of the thin-layer composite when the composite is exposed to conditions of low and high moisture, respectively, as compared to thin lignocellulosic composites made by other methods, or using non-isocyanate resins. As used herein, a normal moisture level of a thin-layer composite typically ranges between 6% and 9%. Moisture contents below this range may be considered low moisture, and moisture contents above this range may be considered high moisture.

Thus, in an embodiment, when thin-layer composites of the present invention are exposed to an atmosphere where the moisture level is low, the composite of the present invention exhibits less shrinkage than thin-layer composites made with other resins. Also, in an embodiment, when thin-layer composites of the present invention are exposed to an atmosphere where the moisture level is high, the composite of the present invention exhibits less swelling than thin-layer composites made with other resins.

For example, in an embodiment, the thin-layer composite comprises up to 50% less linear expansion and thickness swelling after being immersed for 24 hours in 70° F. (21° C.) water than a thin-layer composite comprising comparable levels of an alternate (non-isocyanate) resin, or lower amounts of the isocyanate resin. Also in an embodiment, the predetermined resistance to moisture comprises a thickness swelling of less than 15% after being immersed for 24 hours in water at 70° F. (21° C.).

Also in an embodiment, doorskins made by the methods of the present invention are significantly less dense than doorskins made using traditional formaldehyde-based resins. Thus, in an embodiment, the thin-layer lignocellulosic composites of the present invention comprise a density of less than 60 pounds per cubic foot (962 kg/m$^3$). In another embodiment, the thin-layer lignocellulosic composites of the present invention may comprise a density of less than 55 pounds per cubic foot (881.5 kg/m$^3$).

Preparation of Thin-Layer Wood Composites Having Increased Water Resistance

Several methods have been explored to produce wood composites that exhibit increased resistance to moisture uptake and loss. It is believed that swelling and/or shrinking of wood is, at least partially, the result of water reacting with hydroxyl groups present in cellulose and hemicellulose. Thus, high moisture levels increase the amount of water bound to the wood fiber. Alternatively, in low humidity, water is lost from the wood fibers.

Wood may be treated with chemical agents to modify the hydroxyl groups present in the cellulose and to thereby reduce the reactivity of cellulose fibers with water. For example, acetylation of cellulose fibers can reduce the number of hydroxyl groups available to react with water and thus, makes the wood less susceptible to heat-induced drying or moisture-induced swelling. Still, on a large scale, acetylation may not be commercially viable as it is expensive to perform and entails significant disposal costs.

Formaldehyde resins may also be used as a means to modify the hydroxyl groups in cellulose fibers as a result of the formaldehyde bonding to the hydroxyl sites in cellulose. For example, phenol-formaldehyde resins may be used. However, the phenol-formaldehyde resins require high temperature and pressure for curing. Such resins cannot be used efficiently with wood that has a moisture content of greater than 8% as the water interferes with the curing step. Thus, use of phenol-formaldehyde resins requires drying the wood prior to curing. After curing, the wood must then be re-hydrated to increase the moisture level of the wood such that a wood composite having acceptable commercial properties is achieved.

Alternatively, fibers from non-wood sources that may have reduced cellulose can be employed, such as fiber from corn and flax seed. Still, these fibers are not typically used to make composites because these fibers are often not consistently available or as economical as wood fiber.

The present invention is concerned with methods to employ isocyanate resins to improve the moisture-resistance of thin-layer lignocellulosic composites, such as, but not limited to, wood doorskins. Isocyanate resins such as diphenylmethane-4,4'-diisocyanate (MDI) and toluene diisocyanate (TDI) resin are highly effective in modifying the reactive groups present on cellulose fibers to thereby prevent the fibers from reacting with water. It is believed that the isocyanate forms a chemical bond between the hydroxyl groups of the wood cellulose, thus forming a urethane linkage.

Efforts to develop isocyanate resins for thin-layer wood composites are described in U.S. Pat. No. 3,440,189, describing the use of isocyanate resin and a basic catalyst, U.S. Pat. No. 4,100,138, describing the use of an isocyanate and a polyether polyol binder, as well as U.S. Pat. No. 4,359,507, describing use of isocyanates mixed with ethylene carbonate and propylene carbonate as a binder. Also, U.S. Pat. No. 6,620,459 describes a method for impregnating wood substrates with an isocyanate resin by dipping the wood in the resin followed by subsequent polymerization steps, and U.S. Pat. Nos. 4,388,138 and 4,396,673 describe use of a binder of polyisocyante and a wax release agent. U.S. Pat. No. 5,344,484 describes the use of low-temperature pressing to prepare isocyanate-bonded wood composites described as having high surface strength but porous enough such that adhesives can bond the treated thin-layer composite to an underlying wood frame. U.S. Pat. No. 5,344,484 describes that such wood composites include 1 to 4% isocyanate resin. Still, it has been found that such low levels of resin that do not provide consistent levels of moisture resistance to thin-layer wood composites.

To provide a thin-layer wood composite that is resistant to water, resin contents of greater than 5%, and more preferably at levels of about 10%, up to about 15%, are required. However, there are problems when manufacturing thin-layer lignocellulosic composites using isocyanate-based resins at concentrations greater than 5%. For example, doorskins are generally on the order of 2 to 5 mm in thickness, with a total surface area of 20 square feet (i.e., 1.86 square meters). When such thin-layer wood composites made with 10% isocyanate resin are prepared using conventional pressing methods, the high resin levels cause the wood composite to stick to the pressing die used to prepare the doorskin after only a few pressing cycles.

FIG. 1 shows an overview of a general method used to prepare doorskins. Generally, a selected wood starting material is ground to prepare fibers of a uniform size and the appropriate amount of wax added. At this point the preparation may be stored until further processing. The fiber/wax blend is then mixed with an appropriate binder resin (e.g., using atomization), until a uniform mixture is formed. It is also common to add the resin to the fiber prior to storage of the fiber.

The mixture may then be formed into a loose mat which is pre-shaped using a shave-off roller and pre-compressed to a density of about 6-8 pounds per cubic foot. After further trimming to the correct size and shape, the pre-pressed mat is introduced into a platen press, and compressed between two dies under conditions of increased temperature and pressure. For example, standard pressing conditions may comprise pressing at 320° F. at 1200 psi for 10 seconds followed by 50 seconds at 500 psi (i.e., about 160° C. at 84.3 kg/cm$^2$ for 10 seconds followed by 50 seconds at 35.2 kg/cm$^2$). Generally, a recessed (female) die is used to produce the inner surface of the doorskin, and a male die shaped as the mirror image of the female die is used to produce the outside surface of the skin. Also, the die which is forming the side of the doorskin that will be the outer surface may include an impression to create a wood grain pattern. After cooling, the resulting doorskin is mounted onto a doorframe using a standard adhesive and employing methods standard in the art.

Embodiments of the present invention recognize that the use of a release agent and/or an anti-bonding agent during the manufacture of wood composite doorskins allows for increased levels of resin to be used for the manufacture of doorskins made by low-temperature pressing.

Thus, in an embodiment (FIG. 2), the present invention describes a method for making a thin-layer wood composite having increased water resistance comprising forming a wood composite mixture 2 comprising: (i) a refined wood fiber 4 having a predefined moisture content of about 10 to 14%; (ii) 0.5 to 2.0% wax; (iii) greater than 5% by weight of an organic isocyanate resin; and (iv) optionally, at least 1% by weight of an internal release agent (FIG. 2(*a*)). The mixture may be prepared in bulk using standard blowline blending of the resin and fibers. Or, blenders 9 having a means for mixing 3 such as a paddle or the like, may be used.

Figures 2A, 2B, 2C, 2D, 2E:
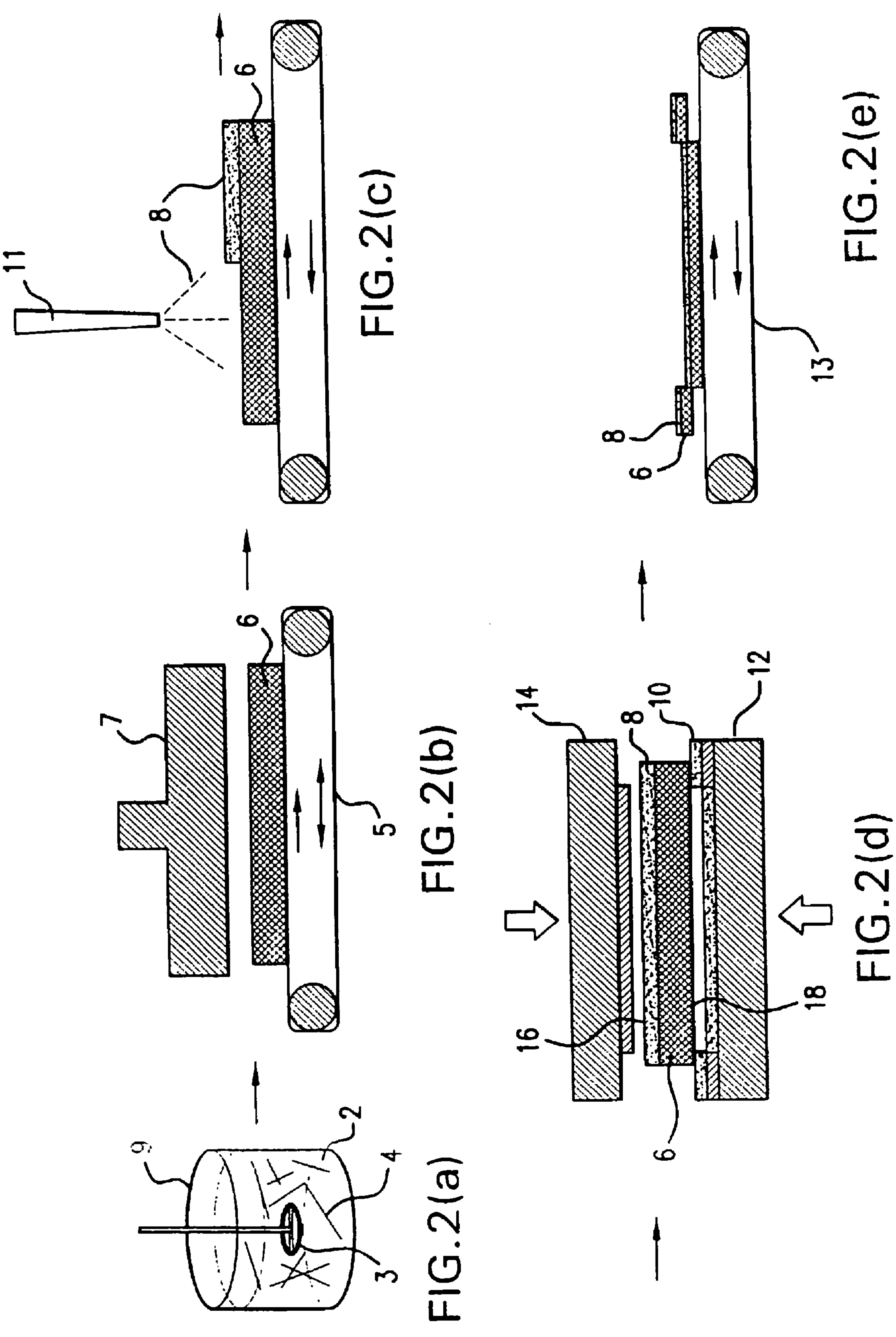
FIG. 2 shows an embodiment of a method used to make water-resistant thin-layer wood composites in accordance with an embodiment of the present invention where panel (a) shows mixing of the lignocellulosic fiber and resin; panel (b) shows forming the composite into a loose mat; panel (c) shows spraying the loose mat with release agent; panel (d) shows pressing the mat between two dies; and panel (e) shows the resultant thin-layered composite product.

Next, the wood composite mixture may be formed into a loose mat in a forming box. The mat is then pre-shaped using a shave-off roller (not shown in FIG. 2) and precompressed using a roller or some other type of press 7 (FIG. 2(*b*)). The specific density of the mat may vary depending on the nature of the wood composite being formed, but generally, the mat is formed to have a density of about 6 to 8 pounds per cubic foot (i.e., 96.2-128.1 kg per cubic meter). After further trimming of the mat to the correct size and shape, at least one surface of the mat may be exposed to additional release agent 8 by spraying the release agent onto the surface of the mat 6 using a spray nozzle 11 (FIG. 2(*c*)). Also, shown in FIG. 2 are conveyors 5 and 13 as a means for transferring the wood composite from one station to another. It is understood that other means of supporting or transferring the thin-layer wood composite from one station to another, or supporting the composite during the processing steps may be used.

The mat 6 may then be placed between a male die 14 and a female die 12, and pressed at an elevated temperature and pressure and for a sufficient time to further reduce the thickness of the thin-layer composite and to allow the isocyanate resin to interact with the wood fibers (FIG. 2(*d*)). As described above, it is believed that by heating the wood composite in the presence of the resin, the isocyanate of the resin forms a urethane linkage with the hydroxyl groups of the wood cellulose. Replacement of the hydroxyl groups of the cellulose with the urethane linkage prevents water from hydrating or being lost from with the cellulose hydroxyl groups. Thus, once the resin has cured, a doorskin having a predetermined resistance to moisture is formed. As described above, in an embodiment, one of the dies may be coated with an anti-bonding agent. FIG. 2 shows and embodiment in which the female die 12 is coated on its inner surface with an anti-bonding agent 10.

In alternative embodiments, both dies (12 and 14) are coated with anti-bonding agent. For example, this embodiment may be preferred where both die surfaces do not have a grain pattern, but are smooth. Or, in an embodiment, both inner die surfaces may be coated with an anti-bonding agent, and the use of release agent to coat the mat may vary depending upon the particular wood composite being prepared. Or, in an embodiment, the method may employ release agent on the surface of the mat, without coating of the dies. In yet another embodiment, the method may employ an internal release agent in the mat, without coating of the dies.

Subsequently, the doorskin is allowed to cool (FIG. 2(*e*)) and then further processed (sizing and priming) prior to being applied to a doorframe.

Thus, the invention describes using a release agent and/or anti-bonding agent to prevent the thin-layer wood composite from sticking to the pressing dies during production. In this way, resin levels as high as 10% to 15% may be used to form doorskins that are only a few millimeters thick (e.g., about 3 mm), without the composite sticking to the dies during pressing.

The release agent and/or anti-bonding agent used to prevent the mat from sticking to the dies during production may be applied to the mat in various ways. Generally, when the mat is used to produce a standard doorskin, one of the dies comprises a recess and is described as the female die. Referring to FIG. 2, usually the female die 12 is positioned underneath the lower surface 18 of the mat, which is the surface of the mat that is adhered to the underlying doorframe (i.e., the inner surface). The other (upper) surface of the mat 16 corresponds to the side of the doorskin that will be on the outside of the door. Often, this side of the doorskin will include a grain texture to improve the decorative effect. The die 14 used to press the upper side of the mat (i.e. the eventual outside of the door) may be termed the male die. Thus, the male die includes a protruding portion that is the mirror image of the recess on the female die, and optionally, a grain-like pattern on the surface of the die.

In one embodiment, an anti-bonding agent is coated onto the bottom (female) die. Depending on the actual anti-bonding agent used, the coating may be baked onto the bottom die. In this way, the coated die may be used several times before recoating with additional anti-bonding agent. For example, in an embodiment, the step of baking the anti-bonding agent onto the die surface comprises the steps of: (i) cleaning the die surface free of any dirt, dust or grease; (ii) spraying about 0.003 inches (3 mils; 0726 mm) of a 50% solution of the anti-bonding agent onto the die; and (iii) baking the die at over 300° F. (149° C.) for about 1-4 hours. In an embodiment, the step of cleaning the die comprises cleaning the die surface with a degreaser; wire brushing to remove solids; wiping the die surface with a solvent (such as acetone); and buffing with a cotton pad. The anti-bonding agent is then applied to provide a 3 mil thickness; and the dies heated to bake the coating onto the die.

Under suitable conditions, the anti-bonding agent that is baked onto the die (or dies) is stable enough to the pressing conditions such that the die(s) can be used for over 2000 pressing cycles prior to requiring a second coating with additional anti-bonding agent. Anti-bonding agents that are suitable for baking onto the die surface include CrystalCoat MP-313 and Silvue (SDC Coatings, Anaheim, Calif.), ISO-Strip-23 Release Coating (ICI Polyurethanes, West Deptford, N.J.), aminoethlyaminopropyltrimethoxysilane (Dow Corning Corporation), or the like.

In another embodiment, to facilitate release of the doorskin, the die(s) may be nickel plated, covered with a ceramic layer, or coated with fluorocarbons.

As described above, a release agent may be sprayed onto one of the surfaces of the pre-pressed mat prior to the mat being pressed between the dies. For example, and referring again to FIG. 2, a release agent 8 may be sprayed onto the upper surface 16 of the mat 6 which is exposed to the male die 14, Preferably, the release agent 8 sprayed directly onto the surface of the mat is a release agent that is compatible with the wood and resin making up the composite. Preferably, the release agent sprayed on the wood comprises compounds such as PAT®-7299/D2, PAT®-1667 (Wurtz GmbH & Co., Germany), and the like.

The amount of release agent sprayed onto at least one side of the mat may range from 0.1 to 8.0 grams solids per square foot (1.1 to 86.1 grams per square meter) of mat. For example, the release agent may be sprayed onto the mat as a 25% aqueous solution. In an embodiment, the amount of release agent sprayed on to at least one side of the mat may comprise about 4 grams solids per square foot (i.e., 43.05 grams per square meter) of mat sprayed as a 25% aqueous solution.

Alternatively, the release agent may be added directly to the mixture used to form the wood composite. In this embodiment, the release agent comprises up to about 1 to 8% by weight of the composite. For example, the release agent may be added as a solution (typically about 25% to 50% solids) and blended with the wood fiber, resin and wax. This approach has the advantage of not requiring equipment to spray the release agent onto the mat. Adding the release agent as part of the wood composite may require the use of more release agent than when only the surface of the composite is exposed. In some cases (e.g., low production runs) the cost of the extra materials is justified since the production set up is simplified.

The release agent used to coat the mat is distinct from the anti-bonding agent used to coat the die surface(s). The anti-bonding agent used to coat the die surface(s) generally may comprise agents such as silane or silicone based chemicals that are known to be effective coating agents. These anti-bonding agents, however, are not always suitable for spraying directly on the wood mat (or incorporating into the wood composite) since silane or silicone based compounds can interfere with later finishing of the wood product by priming and/or painting. Waxes may also act as release agents to some extent. Still, it was found that waxes common to the door manufacturing industry are generally not particularly effective in preventing the wood composite from sticking to either the male or female dies.

Also, the release agent may be clear, or it may include a pigment. For example, a tinted release agent comprising the outer surface of a door would facilitate subsequent priming or painting of the door.

As described herein, the present invention describes the use of isocyanate resins to prepare wood composites. One of the advantages of using isocyanate resins rather than formaldehyde crosslinked resins is that less energy is needed to dry the wood fiber prior to pressing the mat. As described herein, traditional phenol-formaldehyde resins are not compatible with wood having a water content much greater than 8%, as the water tends to interfere with the curing process. Also, excess moisture in the wood fiber can cause blistering when pressed with melamine-formaldehyde resins or urea-formaldehyde resins. Thus, for wood having a moisture content of greater than 8%, the wood must be dried for the curing step, and then re-hydrated later. In contrast, isocyanate-based resins are compatible with wood having a higher water content and thus, curing with isocyanate-based resins may obviate the need for the drying and the re-hydrating steps associated with formaldehyde-based resins.

To prepare a wood composite that is resistant to water, the concentration of the isocyanate resin should be at least 5%, and more preferably be on the order of about 10%. Generally, at levels of about 14-15%, maximum resistance to moisture-induced swelling and/or shrinking is observed.

Generally, organic isocyanates standard in the art may be employed. Suitable isocyanates may include toluene 2,4-diisocyanate; toluene-2,6-diisocyanate; isophorone diisocyanate; diphenylmethane-4,4'-diisocyanate; 3,3'-dimethyldiphenylmethane-4,4'-diisocyanate; m-phenylene diisocyanate; p-phenylene diisocyanate; chlorophenylene diisocyanate; toluene-2,4,6-triisocyanate; 4,4',4"-triphenylmethane triisocyanate; diphenyl ether 2,4,4'-triisocyanate; hexamethylene-1,6-diisocyanate; tetramethylene-1,4-diisocyanate; cyclohexane-1,4-diisocyanate; naphthalene-1,5-diisocyanate; 1-methoxyphenyl-2,4-diisocyanate; 4,4'-biphenylene diisocyanate; 3,3'-dimethoxy-4,4'-biphenyl diisocyanate; 3,3'-dimethyl-4,4'-biphenyl diisocyanate; 4,4'-dimethyldiphenylmethane-2,2',5,5'-tetraisocyanate; 3,3'-dichlorophenyl-4,4'-diisocyanate; 2,2',5,5'-tetrachlorodiphenyl-4,4'-diisocyanate; trimethylhexamethylene diisocyanate; m-xylene diisocyanate; polymethylene polyphenylisocyanates; and mixtures thereof. Most preferred are toluene diisocyanates or diphenylmethane diisocyanates.

Commercial preparations of the isocyanate resin material may contain not only 4,4'-methylene diphenyl diisocyanate, but also poly(methylene diphenyl diisocyanate) otherwise known as polymeric MDI (or PMDI), mixed methylene diphenyl diisocyanate isomers, and 2,4'-methylene diphenyl diisocyanate (see e.g., U.S. Pat. No. 6,620,459 for a discussion of the nature of non-monomeric species in commercial preparations of MDI). Still, commercially available preparations of 4,4'-methylene diphenyl diisocyanate give thin-layer composites of high consistency when used as described herein.

In an embodiment, the press time and temperature may vary depending upon the resin used. For example, using a toluene diisocyanate (TDI) resin as opposed to diphenylmethane diisocyanate (MDI) resin may shorten the press time by as much as 10%. Generally, when using isocyanate resins, very high temperatures are not required; thus, isocyanate resins are associated with decreased energy costs and less wear on the boiler. Still, composites made at very low temperatures do not display sufficient resistance to moisture to be commercially useful. Thus, the temperature used for pressing may range from 250° F. to 400° F. (121° C. to 204° C.), or more preferably, between 280° F. and 350° F. (138° C. to 177° C.). In an embodiment, ranges between 310° F. (154° C.) to about 330° F. (166° C.) are preferred.

The pressure used during pressing may be constant, or varied in a step-wise fashion. Depending upon the selected temperature and pressure conditions used for pressing, the total pressing may range from 30 seconds to 5 minutes or more. Thus, the pressure during the pressing step may include ranges from about 2500 psi (176 kg/cm$^2$) to about 150 psi (10.5 kg/cm$^2$). Or, the pressure may be applied in a step-wise manner. For example, the pressure during the pressing step may range from about 1200 psi (84.3 kg/cm$^2$) for about 5 to 20 seconds followed by 500 psi (35.16 kg/cm$^2$) for 20 to 80 seconds. In one embodiment, the pressure during the pressure step ranges from about 1200 psi (84.3 kg/cm$^2$) for about 10 seconds to about 500 psi (35.16 kg/cm$^2$) for about 50 seconds.

The present invention also encompasses wood products comprising wood composites made by the method of the invention. For example, in one aspect, the present invention comprises a wood composite a mixture of: (a) no more than 95% by weight of a wood fiber, wherein the wood fiber has a predetermined moisture content; (b) at least 5% by weight of an organic isocyanate resin; (c) optionally, at least 0.5% by weight of a wax; (d) optionally, at least 1% by weight of an internal release agent; and (e) optionally, at least 0.2 grams release agent per square foot (2.15 grams per square meter) as applied to the surface of the composite.

Preferably, wood composites made by the method of the invention comprise significantly less linear expansion and swelling than wood composites made by conventional methods. Thus, doorskins made by the method of the present invention exhibit 50% less linear expansion and thickness swelling than composite doorskins made with formaldehyde-based resins of the same content (such as, for example, 10% melamine-urea-formaldehyde doorskins) when boiled in water for 2 hours. Also, doorskins made by the present invention exhibit 50% less linear expansion than non-isocyanate based doorskins when immersed in water for 24 hours at 70° F. (21.1° C.), a standard test used in the industry (ASTM D1037).

As described above, the thin-layer lignocellulosic composites of the present invention comprise a predetermined thickness, such that the resultant composite comprises a flat planar structure. In an embodiment, the predetermined thickness ranges from 0.100 inches to 0.250 inches (2.54 mm to 6.35 mm). In an alternate embodiment, the predetermined thickness of the thin-layer composite may range from 0.110 to 0.130 inches (2.79 to 3.30 mm).

Also in an embodiment, doorskins made by the methods of the present invention are significantly less dense than doorskins made using traditional formaldehyde-based resins. For a doorskin that is 0.12 inches (3.05 mm) thick and has 10% melamine-urea-formaldehyde resin and 1.5% wax, the density is about 58 pounds per cubic foot (930 kg/m$^3$). In contrast, doorskins of the present invention (10% MDI resin; 0.5% wax) may have a density as low as 50 pounds per cubic foot (801 kg/m$^3$).

EXAMPLE

Various parameters that would be expected to improve the stability of doorskins to water were tested, including altering the moisture content and other attributes of the wood fiber, altering the amount and type of the resin, and altering the press conditions (temperature, pressure and/or time).

Ultimately, it was found that isocyanate-based resin binders provided a wood composite that is resistant to water when resin levels of about 10% and up to about 15% were employed. However, when resin at these levels of resin was used, the resulting composite tended to stick to the pressing dies during manufacture. For example, in a sample run using 10% MDI, about 1.5% wax, and 88.5% wood fiber at 10% moisture content, pressed at a temperature of 320° F. (160° C.) and using pressing cycles as described herein, it was found that after 6 to 8 press loads the wood composite would stick to the pressing dies.

Various methods were tried to prevent the doorskins from sticking to the dies. It was determined that the addition of a release agent to the surface of the pre-pressed mat used to make the doorskin allowed the doorskin to be removed from the male die. In additional experiments, the release agent was added directly to the composite mixture. For effective release, approximately 1 to 8% by weight of the release agent was required. It was found that for consistent results, about 1.5 to 3% internal release agent was preferred.

As the release agent is theoretically only required at the surface, methods to treat the surface of the doorskin were evaluated. It was found that spraying the surface of the mat with a 25% solution of PAT®-7299/D2 (Wurtz GmbH & Co., Germany) provided sufficient release agent to successfully remove the doorskin from the male die. It was further found that concentrations of release agent ranging from 0.1 to 8 grams solid per square foot (1.1 to 86.1 grams per square meter) of mat were effective (generally administered as a 25% solution). However, about 2-4 grams release agent solids per square foot (2.2 to 43.05 grams per square meter) of mat was found to provide consistent results, with higher concentrations providing only minimally better results.

Methods were evaluated to apply a release agent to the underside of the mat and the top surface of the bottom die for each press load. It was found, however, that treating the surface of the bottom die with an anti-bonding agent maybe preferable for eliminating bonding of the mat to the bottom die. An anti-bonding agent, such as Silvue (SDC Coatings) was used to coat the surface of the female die. Initial experiments used excess anti-bonding agent to flood the surface of the die. Further testing indicated that baking the anti-bonding agent onto the surface of the female (bottom) die allowed for the die to be used multiple times prior to being retreated. To bake the anti-bonding agent onto the die, the female die was treated by (i) cleaning the surface of the die free of dust, dirt and grease using a degreaser, wire brush treatment and solvent; (ii) spraying about 0.003 inches (3 mils; 0.0762 mm) of a 50% solution of the release agent onto the die; and (iii) baking the die at a temperature of about 300° F. (149° C.) to 350° F. (177° C.) for about 1-4 hours.

Thus, it was found that addition of 2-4 g per square foot of a release agent to the upper surface of the pre-pressed mat, and baking the anti-bonding agent Silvue (SDC Coatings) onto the female (bottom) die allowed for easy removal of the doorskins having 10% or more MDI resin from both dies easily. Additionally, it was determined that over 2000 press loads could be made prior to recoating the female die with additional anti-bonding agent.

The wood composites made by the method of the invention showed significantly less linear expansion and swelling than wood composites made by conventional methods. Thus, doorskins made by the method of the present invention exhibited 50% less linear expansion and thickness swelling than composite doorskins made with formaldehyde-based resins of the same content (e.g., 10% melamine-urea-formaldehyde doorskins) when boiled in water for 2 hours. Also, doorskins made by the present invention exhibited 50% less linear expansion than comparable formaldehyde-based doorskins than non-isocyanate based doorskins when immersed in water for 24 hours at 70° F. (21.1° C.), a standard test used in the industry (ASTM D1037).

Also, doorskins made by the methods of the present invention were found to be significantly less dense than doorskins made using traditional formaldehyde-based resins. For example, a doorskin that is 0.12 inches (3.05 mm) thick and has 10% melamine-urea-formaldehyde resin and 1.5% wax has a density of about 58 pounds per cubic foot (930 kg/m$^3$). In contrast, doorskins of the present invention (10% MDI resin; 0.5% wax) were found to have a density as low as 50 pounds per cubic foot (801 kg/m$^3$).

It will be recognized by those in the art that the advantages of the methods and compositions disclosed here include:

1. Preparation of thin-layer lignocellulosic composites, such as doorskins, that have increased resistance to moisture-induced shrinking and/or swelling;

2. Reduced energy costs for preparation of thin-layer lignocellulosic composites, such as doorskins, in that pre-drying of the wood is reduced significantly;

3. A method adaptable to high-throughput production in that multiple doorskins may be pressed without re-coating of the pressing dies;

4. Use of isocyanate-based resins at concentrations which provide high water-resistance in a thin-layer lignocellulosic wood composite; and 5. Reduced cost of the thin-layer lignocellulosic composite as additional treatments to impart moisture-resistance are not required.

It will be understood that each of the elements described above, or two or more together, may also find utility in applications differing from the types described. While the invention has been illustrated and described as a method for high-throughput preparation of thin-layer lignocellulosic composites, such as doorskins, it is not intended to be limited to the details shown, since various modifications and substitutions can be made without departing in any way from the spirit of the present invention. As such, further modifications and equivalents of the invention herein disclosed may occur to persons skilled in the art using no more than routine experimentation, and all such modifications and equivalents are believed to be within the spirit and scope of the invention as described herein.

That which is claimed is:

1. A door skin, comprising:

a lignocellulosic composite formed from a mixture comprising:

about 80% to 95% by weight of lignocellulosic fiber, having a moisture content of between 7% and 20% by weight, the lignocellulosic fiber selected from at least one of the following: straw, hemp, sisal, cotton stalk, wheat, bamboo, jute, salt water reed, palm frond, flax, groundnut shell, hard wood, and soft wood;

an organic isocyanate resin;

an internal release agent; and at least one type of wax, the door skin having a thickness of between 0.03937 inches (1 mm) and 0.250 inches (6.35 mm) as a result of pressure between two dies at an elevated temperature and pressure and for a sufficient time to allow the isocyanate resin to interact with the lignocellulosic fiber.

2. The door skin of claim 1, wherein the mixture comprises up to about 2% by weight of wax.

3. The door skin of claim 1, wherein the release agent comprises an emulsion of surfactants and polymers.

4. The door skin of claim 1, wherein the release agent is added to the wood mixture prior to pressing the mixture into a thin-layer composite.

5. The thin door skin of claim 4, wherein the amount of release agent added to the composite ranges from about 0.5% to about 8% by weight.

6. The door skin of claim 1, wherein the mixture is preformed into a loose mat, and an additional release agent is sprayed onto at least one surface of the mat prior to pressing the mixture into a thin layer composite.

7. The door skin of claim 6, wherein the amount of release agent sprayed on to the mat surface comprises 0.1 to 8.0 grams solids per square foot (1.1 to 86.1 grams per square meter) of the surface.

8. The door skin of claim 1, wherein the moisture content of the fiber ranges from about 10% to about 14% moisture by weight.

9. The door skin of claim 1, wherein the isocyanate comprises diphenylmethane diisocyanate or toluene diisocyanate.

10. The door skin of claim 1, wherein the isocyanate comprises diphenylmethane-4,4'-diisocyanate.

11. The door skin of claim 1, wherein the door skin has a resistance to moisture which comprises up to a 50% reduction in linear expansion and thickness swelling after being immersed for 24 hours in 70° F. (21° C.) water than a thin-layer composite comprising a resin that does not include isocyanate.

12. The door skin of claim 1, wherein said door skin has a resistance to moisture which comprises a thickness swelling of less than 15% after being immersed for 24 hours in water at 70° F. (21° C.).

13. The door skin of claim 1, wherein the door skin thickness ranges from about 0.110 inches (2.79 mm) to 0.130 inches (3.30 mm).

14. The door skin of claim 1, wherein the door skin has a density of less than about 60 pounds per cubic foot (962 $kg/m^3$).

15. The door skin of claim 1, wherein the door skin has a density of less than about 55 pounds per cubic foot (881.2 $kg/m^3$).

16. The door skin of claim 1, wherein the door skin is suitable for priming or painting despite the inclusion of the release agent.

17. The door skin of claim 1 wherein at least one of the dies is coated with an anti-bonding agent including a ceramic material.

18. The door skin of claim 1, further comprising a surface area of a standard door face.

19. The door skin of claim 1, in which the pressure between the two dies is greater than or equal to 1200 psi.

20. The door skin of claim 1, in which the wax is selected from at least one of the following: paraffin wax, polyethylene wax, polyoxyethylene wax, microcrystalline wax, shellac wax, ozokerite wax, montan wax, emulsified wax, and slack wax.

21. The door skin of claim 1, in which an external release agent is applied to the mixture.

22. The door skin of claim 1, further comprising:

an outer surface intended to be on the outside of a door, the outer surface including a recessed portion; and an inner surface opposing the outer surface, the inner surface including a protruding portion that is the mirror image of the recessed portion of the outer surface.

23. The door skin of claim 1, further comprising:

an outer surface intended to be on the outside of a door, the outer surface including a grain texture or grain-like pattern.

24. The door skin of claim 1, wherein the door skin has a surface area of 20 square feet or more.

25. The door skin of claim 1, wherein the door skin has a thickness greater than 0.100 inches.

26. A door skin, comprising:

a lignocellulosic composite formed from a mixture of about 80% to 95% by weight of at least one type of lignocellulosic fiber, wherein the fiber has a moisture content of between 7% and 20% by weight;

at least 5% by weight of an organic isocyanate resin;

an internal release agent;

at least one type of wax, the door skin having a thickness of between 0.03937 inches (1 mm) and 0.250 inches (6.35 mm) as a result of pressure between two dies at an elevated temperature and pressure and for a sufficient time to allow the isocyanate resin to interact with the lignocellulosic fiber.

27. The door skin of claim 26, wherein the door skin has a density of less than about 60 pounds per cubic foot (962 $kg/m^3$).

28. The door skin of claim 26 wherein at least one of the dies is coated with an anti-bonding agent that includes a ceramic material.

29. The door skin of claim 26, further comprising a surface area of a standard door face.

30. The door skin of claim 26, further comprising:

an outer surface intended to be on the outside of a door, the outer surface including a grain texture or grain-like pattern.

31. The door skin of claim 26, further comprising:

an outer surface and an opposing inner surface, the outer surface including a recessed portion and the inner surface including a protruding portion that is the mirror image of the recessed portion.

32. The door skin of claim 26, wherein the door skin has a surface area of 20 square feet or more.

33. The door skin of claim 26, wherein the door skin has a thickness greater than 0.100 inches.

34. A door skin, comprising;

a lignocellulosic composite mixture including:

about 80% to 95% by weight of lignocellulosic fiber;

an organic isocyanate resin;

an internal release agent; and at least one type of wax, the door skin having a thickness of between 0.03937 inches (1 mm) and 0.250 inches (6.35 mm) as a result of pressure between two dies at an elevated temperature and pressure and for a sufficient time to allow the isocyanate resin to interact with the lignocellulosic fiber, the door skin having an outer surface and an opposing inner surface, the outer surface intended to be on the outside of a door, the outer surface including a recessed portion and the inner surface including a protruding portion that is the mirror image of the recessed portion.

35. The door skin of claim 34, wherein at least one of the dies is treated with an anti-bonding agent.

36. The door skin of claim 34, wherein the mixture includes at least 5% by weight of the organic isocyanate resin.

37. A door skin, comprising;

a lignocellulosic composite mixture including:

about 80% to 95% by weight of lignocellulosic fiber;

an organic isocyanate resin;

an internal release agent; and at least one type of wax, the door skin having a thickness of between 0.03937 inches (1 mm) and 0.250 inches (6.35 mm) as a result of pressure between two dies at an elevated temperature and pressure and for a sufficient time to allow the isocyanate resin to interact with the lignocellulosic fiber, the door skin having an impression in an outer surface with a grain texture or grain-like pattern.

38. The door skin of claim 37, wherein at least one of the dies is treated with an anti-bonding agent.

39. The door skin of claim 37, wherein the mixture includes at least 5% by weight of the organic isocyanate resin.

* * * * *